United States Patent [19]
Bernecki et al.

[11] Patent Number: 5,744,777
[45] Date of Patent: Apr. 28, 1998

[54] SMALL PARTICLE PLASMA SPRAY APPARATUS, METHOD AND COATED ARTICLE

[75] Inventors: Thomas F. Bernecki, Grayslake; Daniel R. Marron, Burbank, both of Ill.

[73] Assignee: Northwestern University, Evanston, Ill.

[21] Appl. No.: 656,070

[22] Filed: May 31, 1996

Related U.S. Application Data

[60] Continuation-in-part of Ser. No. 461,434, Jun. 5, 1995, abandoned, which is a division of Ser. No. 352,959, Dec. 9, 1994, abandoned.

[51] Int. Cl.⁶ .................................................. B23K 10/00
[52] U.S. Cl. ........................... 219/121.47; 219/121.48; 219/121.51; 219/76.16
[58] Field of Search ..................... 219/121.47, 121.48, 219/121.5, 121.51, 76.15, 76.16

[56] References Cited

U.S. PATENT DOCUMENTS

| | | |
|---|---|---|
| 3,304,402 | 2/1967 | Thorpe . |
| 3,591,759 | 7/1971 | Stand . |
| 3,676,637 | 7/1972 | Stand .................................. 219/121 P |
| 3,684,911 | 8/1972 | Perugini et al. ............................ 219/75 |
| 3,914,573 | 10/1975 | Muehlberger ....................... 219/76.16 |
| 3,935,418 | 1/1976 | Stand et al. . |
| 4,104,505 | 8/1978 | Rayment et al. . |
| 4,370,538 | 1/1983 | Browning ............................. 219/121.47 |
| 4,964,568 | 10/1990 | Rotolico et al. ...................... 219/76.16 |
| 5,013,883 | 5/1991 | Fuimefreddo et al. ............. 219/121.47 |
| 5,340,023 | 8/1994 | Itoh et al. . |

Primary Examiner—Mark H. Paschall

[57] ABSTRACT

A method of coating a surface using a plasma arc torch comprises directing a plasma plume externally from a discharge end of the plasma torch toward the surface, positioning a powder injector proximate the plasma plume to introduce ceramic oxide powder particles at a size less than 20 microns diameter into an outer mantle of the plasma plume so that the powder particles are confined in the outer mantle, directing first and second gas jets at the plasma plume downstream of the powder injector position and on opposite sides of the plasma plume to enhance entrainment of the injected powder particles in the outer mantle, circulating the powder particles in the outer mantle of the plasma plume for a residence time to heat the powder particles to melt them without substantial vaporization, and depositing the melted powder on the surface as a dense coating having closed porosity.

13 Claims, 9 Drawing Sheets

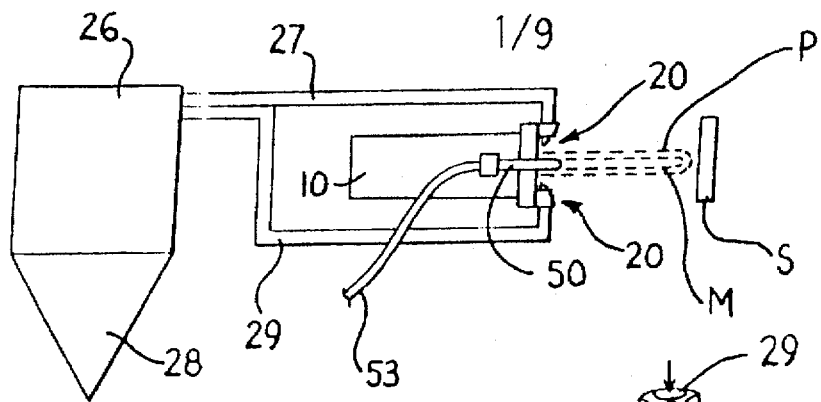
FIG. 1
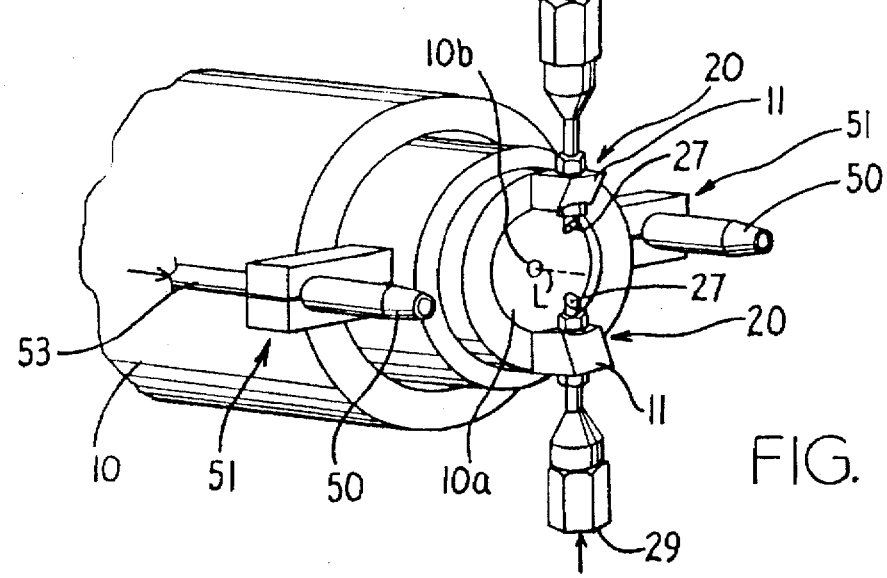
FIG. 2
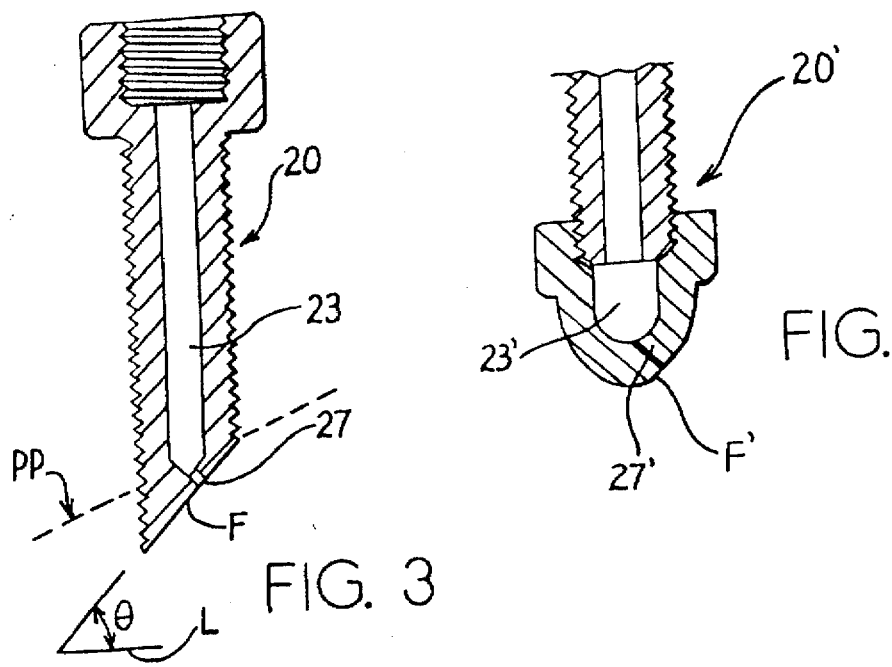
FIG. 3
FIG. 4

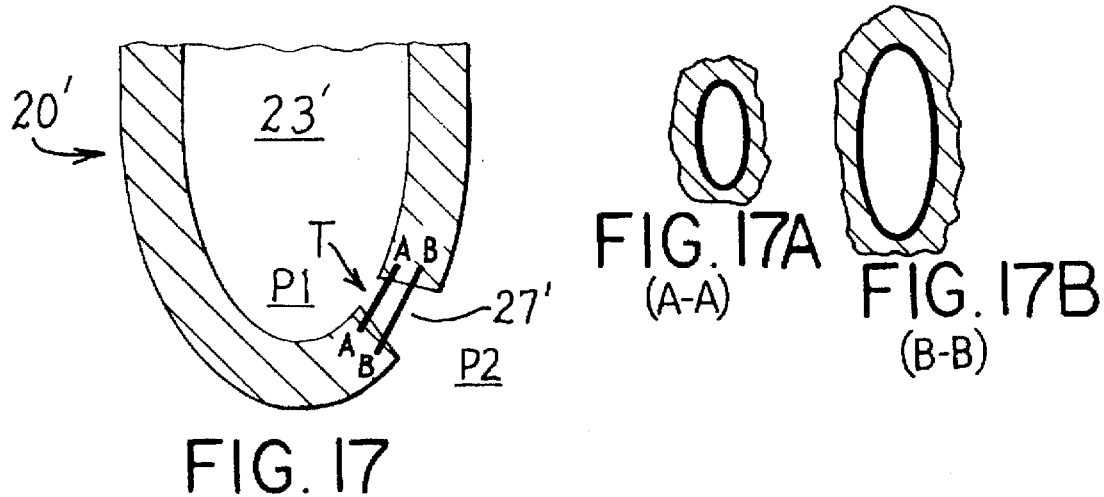
FIG. 17   FIG. 17A (A-A)   FIG. 17B (B-B)
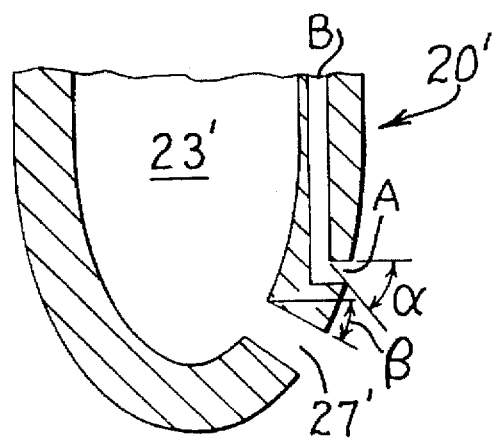
FIG. 18

SMALL PARTICLE PLASMA SPRAY APPARATUS, METHOD AND COATED ARTICLE

This application is a continuation-in-part of U.S. Ser. No. 08/461,434, filed Jun. 5, 1995, now abandoned, which is a division of U.S. Ser. No. 08/352,959, filed Dec. 9, 1994 now abandoned.

FIELD OF THE INVENTION

The present invention relates to plasma spraying of powders to form a coating on a substrate and, more particularly, to plasma spraying of powder, especially ceramic powder, under conditions to produce coatings with improved control of porosity.

BACKGROUND OF THE INVENTION

Thermal spray (TS) coating technology is one of many methods for applying coatings for the protection of materials in harsh environments. Thermal spray coating technology historically has been associated with the application of thick coatings whose bulk material properties allow the substrate to perform in a manner beyond its capabilities when used in an uncoated condition. The desire to apply coatings with diverse thermophysical properties has resulted in a diverse family of coating processes sharing the same basic elements. In general, a source of heat is used to generate a region of high enthalpy, and a material, originally in powder, wire, or rod form, is introduced into the region to form droplets in either a molten or plastic state. These droplets are accelerated onto a prepared substrate where they bond to form a protective coating. Some of the limitations of the thermal spray process generally are observed to be relatively low coating-to-substrate bond strengths, a high amount of connective porosity within the coating, and high thickness of the coating. TS coatings are generally sprayed to a thickness that overcomes the connective porosity. Fine, closed, dispersed porosity is advantageous for ceramic coatings since such porosity introduces thermal shock resistance and permits a reduced coating thickness.

The structure of thermal sprayed coatings typically is lamellar in nature comprising particles which have been flattened by impingement at high particle temperature onto the substrate. By far the most versatile thermal spray process is the plasma spray process. An outgrowth of research into reentry phenomena for the space program, plasma spraying has resulted in the ability to apply coatings comprising high melting point materials, such as ceramic materials. Such plasma spray processes include DC/AC plasma torches (either transferred or non-transferred arc) and radio frequency (RF) plasma torches.

A DC non-transferred arc plasma torch involves maintaining an electric arc within the torch and not involving the substrate as part of the electric arc-generating circuit. In particular, a stick cathode, generally fabricated of thoriated tungsten, is coaxially aligned with a ring anode/nozzle generally fabricated of OFHC copper or, in some torches, with an additional lining of tungsten. An electrical potential is imposed between the anode and the cathode. Gas to be ionized flows around the cathode and through the anode/nozzle. The gap between the cathode and the anode/nozzle is broken down by applying an overvoltage which ionizes the gas and allows electrical current to flow between the electrodes. Particles to be melted are injected radially into the plasma plume either just prior to the exit end of the anode/nozzle (i.e. particle lip feed) or external of the exit end of the anode/nozzle (particle external feed).

Primary plasma gases are typically argon and nitrogen. Secondary gases are typically hydrogen and/or helium. In some infrequent applications, argon and nitrogen are used as the plasma gases. For diatomic gases, such as nitrogen and hydrogen, the gases are dissociated and then ionized. For monatomic gases, such as argon and helium, the gases are substantially, if not totally, ionized. In the plasma plume, ionized gases return to lower energy levels, and the gases which were initially diatomic (i.e nitrogen and hydrogen) recombine with a resulting release of large quantities of heat over a narrow temperature range, thereby heating the particles.

In the plasma spray devices described hereabove, the electrode material can contaminate the coatings being applied. When high purity coatings are needed, RF (radio frequency) plasma generators are used. The high frequency plasma generator operates without electrodes and thus yields an uncontaminated plasma and resultant coating. The RF plasma generator is a simple device wherein gas flows through a non-electrically conductive tube closed at the top and open at the bottom and surrounded by a high frequency coil. Ionized gas required for starting the plasma is produced by the introduction of a carbon or tungsten rod into the working space of the coil. By coupling to the starter rod, the high frequency generator heats the rod until gas ionization takes place around the rod. With the high frequency generator now coupled to the ionized gas, the starter rod is removed and plasma gas flowed into the plasma.

An object of the present invention is to provide a plasma spray apparatus and method for applying a coating in a manner to improve coating-to-substrate bond strength and improve coating density (substantially reduced interconnected coating porosity and defects) at reduced coating thicknesses.

Another object of the present invention is to provide a capability to control closed porosity in ceramic and cermet coatings applied by plasma spraying.

Still another object of the present invention is to provide a highly dense, adherent ceramic, metal, and cermet coating applied on substrates at reduced cost by plasma spraying.

SUMMARY OF THE INVENTION

The present invention provides a method and apparatus for coating a surface using a plasma arc torch, wherein a plasma plume is directed externally from a discharge end of the plasma torch toward the surface to be coated. One or more powder injectors is/are positioned so as to introduce powder particles selected from ceramic, cermet, and metal in the ultrafine size range of less than about 20 microns diameter into an outer mantle of the plasma plume so that the powder particles are confined in the outer mantle for recirculation and gradual heating. Optional first and second gas (e.g. air) jets on opposite sides of the plasma plume are directed or impinged at the plasma plume downstream of the powder injectors to enhance entrainment of the injected powder particles in the outer mantle. The powder particles are recirculated in a region of the outer mantle of the plasma plume for a residence time to heat the particles to melt them without substantial vaporization thereof. The melted powder is deposited on the surface as a dense coating.

In one embodiment of the invention, each powder injector includes an elliptical shaped particle discharge passage oriented at an angle between about 30 and 60 degrees relative to an axis perpendicular to a longitudinal axis of the torch to introduce the ultrafine powder particles into the outer mantle, rather than the hotter core of the plasma plume.

In another embodiment of the invention, the first and second gas jets are directed an acute angle to opposite sides of said plasma plume in a common plane, and the first and second powder injectors are disposed in a common plane normal or otherwise oriented relative to the plane of the gas jets.

In still another embodiment of the invention, each powder injector comprises a converging powder supply passage and a discharge passage communicating with the supply passage a distance from an end thereof. The powder supply passage can have a conical shape such that the discharge passage intersects therewith a distance from the apex of the conical shape. The powder supply passage also can have a partial spherical configuration such that the discharge passage intersects therewith a distance from an end of the spherical shape. The injector can include an aerodynamic surface, such as a hemispherical surface, that reduces powder particle accumulation on its surface.

In a further embodiment of the invention, the particle discharge passage has an elliptical shape with reduced dimensions (minor and major dimensions) for supplying powder particles in the size range of less than about 20 microns to a deflector surface. The size of the powder discharge passage thus is correlated to the size of the powder to be delivered to the torch.

The present invention provides a denser coating on a substrate surface wherein the coating comprises particles selected from the group consisting essentially of ceramic, cermet, and metal particles plasma sprayed in the size range of less than about 20 microns. The coating exhibits predominantly closed porosity; i.e. porosity not interconnected to one another or to the surface of the coating. Such a dense coating exhibits reduced permeability to gas and liquid as required for certain service applications.

DESCRIPTION OF THE DRAWINGS

FIG. 1 is schematic elevational view of plasma spray apparatus in accordance with one embodiment of the invention.

FIG. 2 is a partial perspective view of plasma spray apparatus of FIG. 1.

FIG. 3 is a sectional view of a powder injector of one embodiment of the invention.

FIG. 4 is a sectional view of a powder injector of another embodiment of the invention.

FIG. 17 is a partial sectional view of the powder injector of FIG. 4 modified to have a diverging powder discharge passage, FIGS. 17A and 17B showing the passage profile taken at lines A—A and B—B.

FIG. 18 is a partial sectional view of the powder injector of FIG. 4 modified to have a gas injection passage proximate the powder discharge passage.

DESCRIPTION OF THE INVENTION

Figure 5:
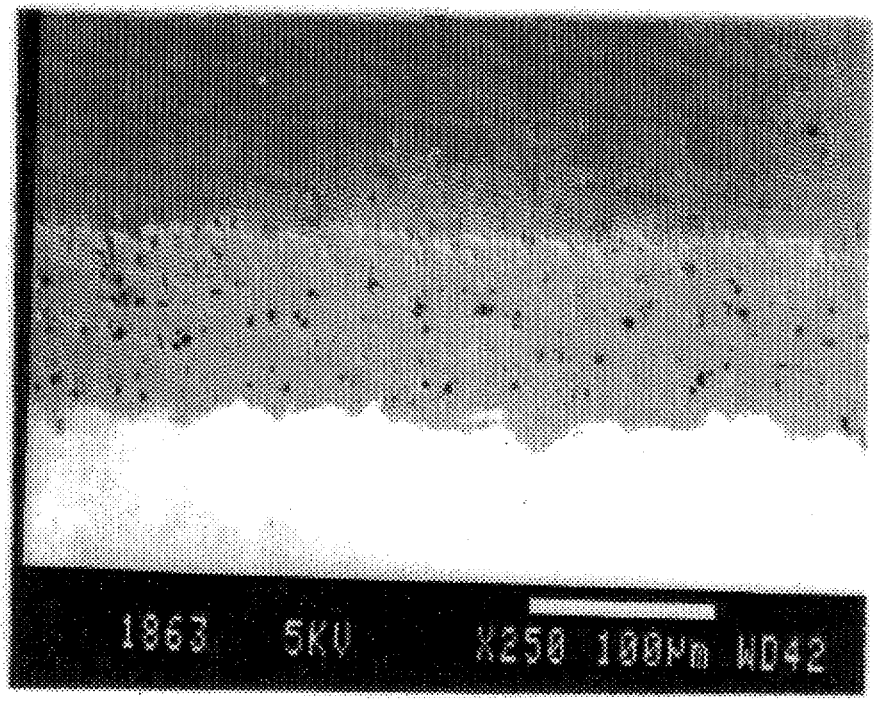
FIG. 5 is a photomicrograph of an alumina coating of the invention comprising plasma sprayed 9 micron diameter alumina powder using an Ar/He plasma.

Referring to FIGS. 1 and 2, apparatus for plasma spray coating of a surface of a substrate is schematically illustrated. The plasma spray apparatus includes a plasma torch 10 having a discharge end 10a with orifice 10b from which a plasma plume P is directed toward the substrate surface S. The substrate can be a wide variety of materials, such as metals, ceramics, plastics, composites and other materials that withstand the heat effect of the plasma spray operation on the substrate surface. The substrate surface can be cooled by gas or liquid cooling if necessary to maintain its temperature below a temperature where substrate properties are adversely affected. The substrate also can be heated prior to coating application to reduce residual stress in an oxide ceramic coating plasma sprayed on the substrate as the coating cools with the substrate.

The plasma torch 10 and substrate S can be disposed in ambient air, in a relative vacuum, or other ambient environment as appropriate for a particular coating application.

The plasma torch 10 can comprise a DC plasma torch available as model F4MB available from Sulzer Metco Inc., Irvine, Calif. The torch uses a plasma forming gas comprising a mixture of argon/helium (Ar/He) or argon/hydrogen (Ar/H2). The latter mixture is used if higher plasma temperatures are desired.

In one embodiment of the invention, multiple (two shown) powder injectors 20 of like construction are positioned downstream of the discharge end 10a of the plasma torch 10 proximate the plasma plume P to introduce powder particles in the size range of less than about 20 microns diameter into an outer mantle M of the plasma plume P. The invention employs small size powder particles not heretofore plasma sprayed and in a controlled or narrow size distribution to substantially improve coating density by reducing porosity. The powder particles preferably are within the size range of about 0.1 microns to less than about 20 microns diameter not heretofore thermally plasma sprayed. The size distribution of the powder particles is controlled within as narrow a range as possible to provide melting of as many powder particles as possible in the plasma while minimizing the amount of unmelted particles due to slower heat transfer of larger particle sizes. Control of particle size distribution within a narrow range improves the plasma sprayed micrstructure by reducing the size and extent of porosity in the coating resulting from unmelted particles. A powder particle size controlled in the range of plus or minus 30% is preferable to this end, especially at smaller particle sizes less than 10 microns diameter, although the invention is not so limited in this regard. Control of powder particle size in this manner reduces the amount of unmelted particles, thereby improving the as-sprayed microstructure by reducing the size and amount of coating porosity.

The powder injectors 20 are supplied with powder from a conventional powder feed hopper 26 having a vibrator 28 attached thereto. The powder is entrained in a carrier gas, such as argon, for supply to the injectors 20 through supply conduits 29. Powder feed systems available as model 1251 Roto-Feed from Miller Thermal Corporation and as twin 10 from Sulzer Metco Inc. have been used in practicing the invention. A modification to these powder feed supply for use in the invention involved a shortening of the feed lines interiorly of the hopper to an extent to prevent clogging of powder at low points of the lines. Also, the hopper was modified by heating to 100° C. using electrical heating tape, and the amplitude and frequency of the vibrator were increased, although not measured, in dependence on particle size for the purpose of preventing clogging of the fine powder and resultant pulsing of the powder flow to the torch.

Powder injectors 20 are threadably mounted on injector supports 11 fastened to the discharge end 10a of the torch 10. Injection of the powder particles from the injectors 20 into and confined in the outer mantle M of the plasma plume P is important to recirculate the particles in the mantle M for a residence time sufficient to gradually heat the particles to melt them without substantial vaporization the particles. The injectors 20 are located relative to the plasma plume P and configured to this end. For example, for the dual powder injectors 20 shown, the injectors 20 are disposed downstream of the discharge end 10a of the torch 10 laterally proximate to the plume. The injectors 20 are spaced on opposite sides of the plume P with the end of the powder discharge passage or port 27 about 9 millimeters (mm) from the centerline of the orifice 10b and 9 mm from the discharge end 10a.

Although dual powder injectors 20 are illustrated, additional multiple injectors can be positioned about the plume P in equally spaced relation thereabout as selected for introducing powder into the outer mantle M of the plasma plume P.

Figure 15:
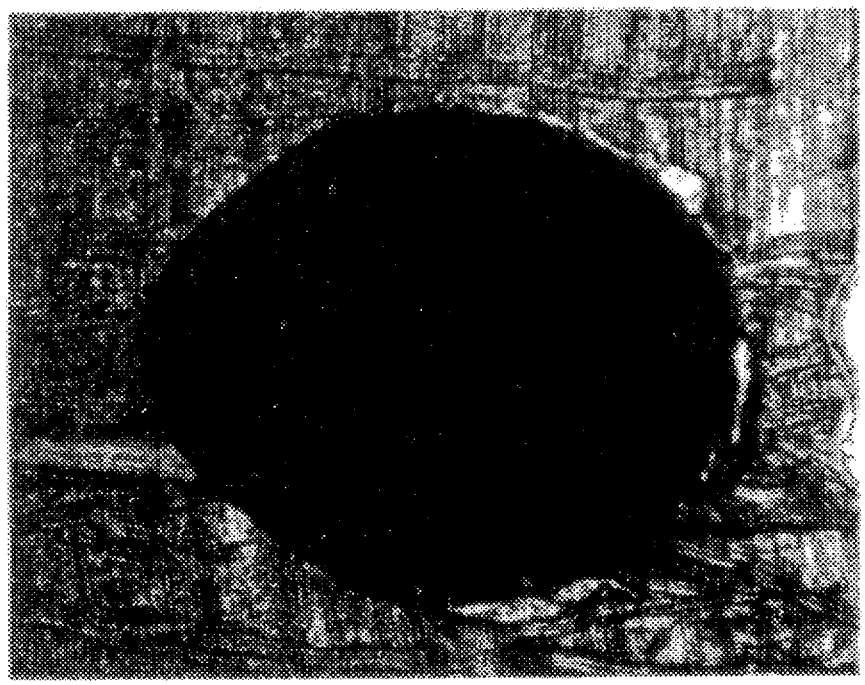
FIG. 15 is a photograph of an elliptical powder discharge passage of an injector.

Further, referring to FIGS. 3 and 4, each injector 20 includes a converging supply passage 23 in FIG. 3 and 23' in FIG. 4 and a discharge passage or port 27 and 27' communicating at an acute angle with the supply passage at a distance from (e.g. above in FIGS. 3-4) an end of the associated supply passage thereof so as to avoid clogging of the powder in the passage or port 27, 27'. In FIG. 3, the converging supply passage 23 comprises a lowermost conical shape, and the cylindrical discharge passage 27 is drilled perpendicular to ground flat F to intersect a distance from the lower apex of the conical shape. The intersection of the passage or port 27 and the conical supply passage 23 forms an initial circular hole. In manufacture of low carbon steel injector 20 of FIG. 3, alumina powder is initially flowed from the powder supply passage 23 through the drilled discharge passage or port 27 until the port 27 assumes an elliptical shape as shown, for example, in FIG. 15 which is a photograph of an elliptical discharge passage or port 27 formed by flowing alumina powder (or other abrasive powder) through a previously drilled cylindrical passage or port. The injector can be hardened by heat treatment after the desired discharge passage or port elliptical minor and major dimensions are developed. Alternately, the injector 20 of FIG. 3 also can be made by grinding the end of the injector to a plane PP (see FIG. 3) intersecting with the conical shape of the supply passage 23.

In FIG. 4, the powder supply passage 23' has a partially spherical (hemispherical) shape, and the cylindrical discharge passage 27' intersects with the supply passage 23' at a distance from a bottom end of the spherical shape so as to avoid clogging of the powder in the passage or port 27, 27'. The length of the powder discharge passage or port can be up to about ½ inch with shorter lengths providing higher acceleration of the carrier gas. The outer aerodynamic hemispherical shape of the injector of FIG. 4 reduces the accumulation of powder thereon. A flat F' is ground or machined on the outer hemispherical surface. The discharge passage 27' typically is drilled perpendicular into the flat F' to intersect the supply passage 23' and form an initial circular hole at the intersection. Abrasive powder, such as alumina, then is initially flowed from the powder supply passage 23 through the drilled discharge passage or port 27 until the port 27 assumes an elliptical shape. The injector can be hardened by heat treatment after the desired discharge passage or port dimensions are developed. The hemispherical injector of FIG. 4 may comprise an acorn nut suitably machined to provide the features described.

The discharge passage or port 27, 27' of each injector 20, 20' terminates at external flat F, F' ground on the conical or hemispherical injector. The flat F, F' is oriented at an angle, theta, of about 30 to 60 degrees relative to an axis parallel to a longitudinal axis L of the torch 10. Since the discharge passage or port 27, 27' is drilled perpendicular to the flat F, F', the longitudinal axis of the discharge passage or port 27, 27' is oriented at the same angle, theta, of about 30 to 60 degrees relative to an axis perpendicular to the longitudinal axis L of the torch 10. This angle is selected so as to introduce the powder particles into the outer mantle M of the plasma plume P.

The powder discharge passage 27' of powder injector 20' can have an elliptical cross-section that diverges outwardly along the axis of the passage toward the exterior surface of the acorn nut of the powder injector so as to form a larger elliptical cross-section proximate the exterior surface than proximate the interior surface of the powder injector as shown in FIG. 17. The axial cross section of the passage 27' increases from plane A—A (FIG. 17A) to plane B—B (FIG. 17B), but the transverse geometry remains elliptical. This allows reduction of gas velocity for feeding very fine powder particles when the cross section of throat T at the passage entrance is unchoked (throat T being a throat in a diverging flow field). When the throat T is not choked, the velocity decreases downstream. For very fine particles, this allows velocity control of the particles without the need to excessively increase the passage exit E. Secondly, if the throat T is choked by proper choice of $P_2/P_1$ and the area of the throat T, this allows the particle velocity to increase downstream giving additional momentum to dense material (i.e. refractory material). With proper selection of $P_2/P_1$ (pressure at the entrance and exit) and the area of the throat T, no additional gas would be necessary. This allows the powder particles to enter a high temperature isotherm within the mantle of the plasma plume without further disrupting the plume.

Referring to FIG. 18, a gas can be injected at a location upstream of discharge passage 27' via a gas injection passage B on the powder injector 20' proximate and upstream of the powder discharge passage. The cross section of the exit A of the gas passage can be a rectangular cross section with angle alpha being 0° to (beta+10°), angle alpha and beta being shown in FIG. 18. This embodiment is advantageous to trap very fine powder particles between the gas flow out of the gas exit and the plasma plume. The gas injected at exit A can be an inert gas, shielding gas, reactive gas, or a gas that influences the chemistry of the sprayed coating. For example, the injected gas could be oxygen rich for retaining proper stochiometry of oxide coatings, nitrogen rich to this same end for nitride coatings, and carbon rich to this same end for carbide coatings.

Figure 16:
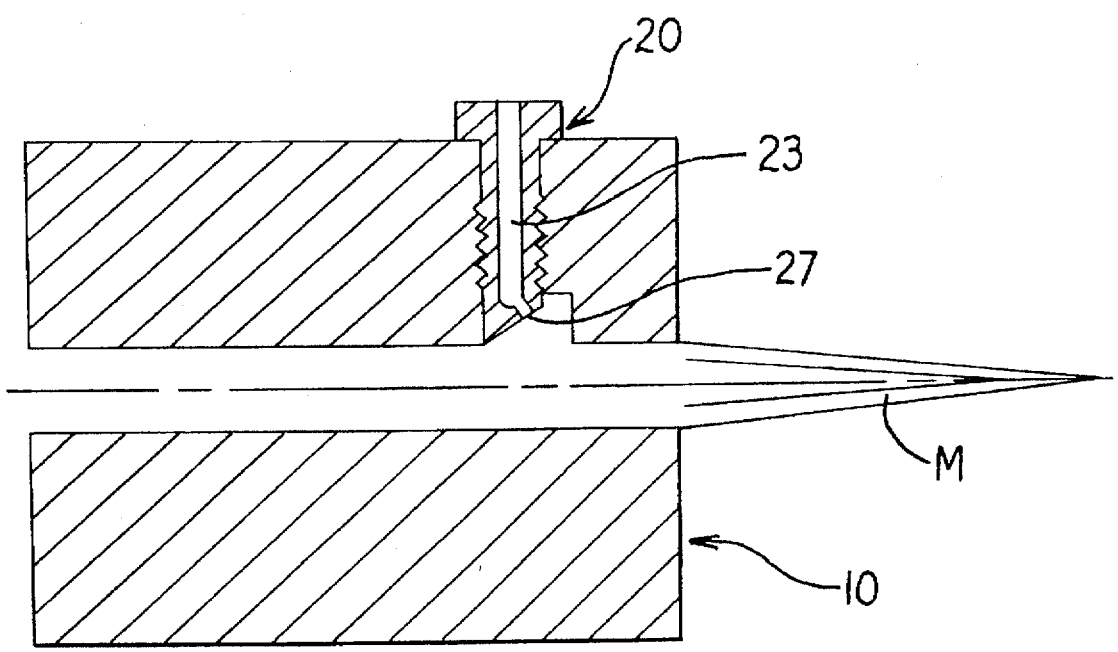
FIG. 16 is a schematic longitudinal sectional view of a plasma torch having a powder injector of the invention disposed therein.

Although FIGS. 1 and 2 illustrate the powder injectors 20 disposed downstream of the discharge end 10a of the plasma torch 10 proximate the plasma plume P, the invention is not so limited and can be practiced with the powder injectors 20 disposed within the torch 10 proximate the discharge end 10a thereof. For example FIG. 16 illustrates schematically such location of the powder injector 20 relative to the discharge end 10a of the torch 10.

Also for proper operation of the injectors 20 is the size of the discharge passage 27 or 27' relative to the size of the powder particles being discharged is controlled. In particular, each injector includes an elliptical shaped particle discharge passage 27 or 27' having a minor dimension in the range of 710 to 1270 microns and a major dimension generally less than three times the minor dimension. For example, a typical powder discharge passage or port 27 has a beginning minor dimension of approximately 52 mils and a major dimension of 62 mils for discharging powder particles in the size range of less than about 20 microns diameter, preferably about 0.1 to less than about 20 microns diameter. However, as the powder is discharged from the injectors during coating application, the port minor and major dimensions change gradually depending upon how abrasive the powder is, and this requires periodic replacement of the injectors as needed to maintain performance of the coating apparatus. Hardening of the steel injectors (e.g. Rc 60) by heat treatment can extend the life of the injectors 20 depending on the abrasiveness of the powder being sprayed. Use of the reduced size powder discharge passages 27 or 27' is effective to provide sufficient gas velocity to carry the particles to the proximate mantle region of the plasma plume P. The diameter of the supply passage 23 of FIG. 3 can be 1.59 mm, while the diameter of supply passage of FIG. 4 can be 5 mm.

The apparatus optionally includes first and second nozzles 50 disposed by clamps 51 on the discharge end 10a of the torch 10 for discharging first and second air or other gas jets at the plasma plume P downstream of the powder injectors 20 on opposite sides of the plasma plume. The air is supplied by conduits 53 and is directed as jets to impinge on the plasma plume P to enhance entrainment of the powder particles injected into the outer mantle M by the injectors 20. The first and second nozzles 50 are disposed in a common plane and oriented at an acute angle (e.g. 30 degrees plus or minus 10 degrees) relative to the longitudinal axis of the torch 10 for directing the gas jets at an acute angle toward opposite sides of the plasma plume. The first and second powder injectors 20 are disposed in a common plane normal to the common plane of the nozzles 50, although the invention is not limited to the plane of the gas jets being normal to the plane of the injectors since other orientations are possible. The nozzles 50 are conventional air jet nozzles available from the plasma torch supplier. Relative to the torch orifice 10b, the nozzles 50 are spaced axially downstream therefrom approximately 1.5 to 3.5 cm and radially outward therefrom by approximately 4.5 mm. The air jets typically have an orifice diameter of 0.15 inch and are supplied with air pressure at approximately 48 psi (supply line pressure).

As mentioned, the powder particles are introduced into the outer mantle M so as to be confined in an isotherm region of the mantle and recirculated by the natural recirculation gas flow of the mantle to gradually heat the small powder particles to melt them without substantial vaporization of the particles. The small powder particles are thereby heated to the appropriate temperature for forming a dense coating on the substrate surface without unwanted vaporization that would otherwise occur, for example, if the particles were introduced into the hotter central core of the plasma plume P. The improved density of the deposited coating evidences that the small powder particles are properly heated without substantial vaporization thereof.

The plasma plume P typically is spaced approximately 2 to 8 cm from the substrate surface to be coated, although the invention is not limited in this regard as other spacing from the substrate can be used depending upon the plasma spray parameters being used. The coating deposited on the substrate surface in the manner described hereabove exhibits improved density and microstructure. In particular, the plasma sprayed coating exhibits predominantly fine closed porosity; i.e. small pores not interconnected to one another or to the surface of the coating, such that the coating permeability to gas or liquid is reduced. The dense coating is deposited at a thickness of about 10 microns to about 20 mils (i.e. 0.020 inch).

Typically, the torch is disposed on a conventional robot arm (not shown) that moves the torch in a conventional stepped ladder pattern horizontal to the substrate surface in multiple passes or scans relative to the substrate to plasma spray its surface. The invention is not so limited and can be practiced using manual torch manipulation.

The following Examples are offered to further illustrate the invention and not limit it.

EXAMPLE 1

Figure 6:
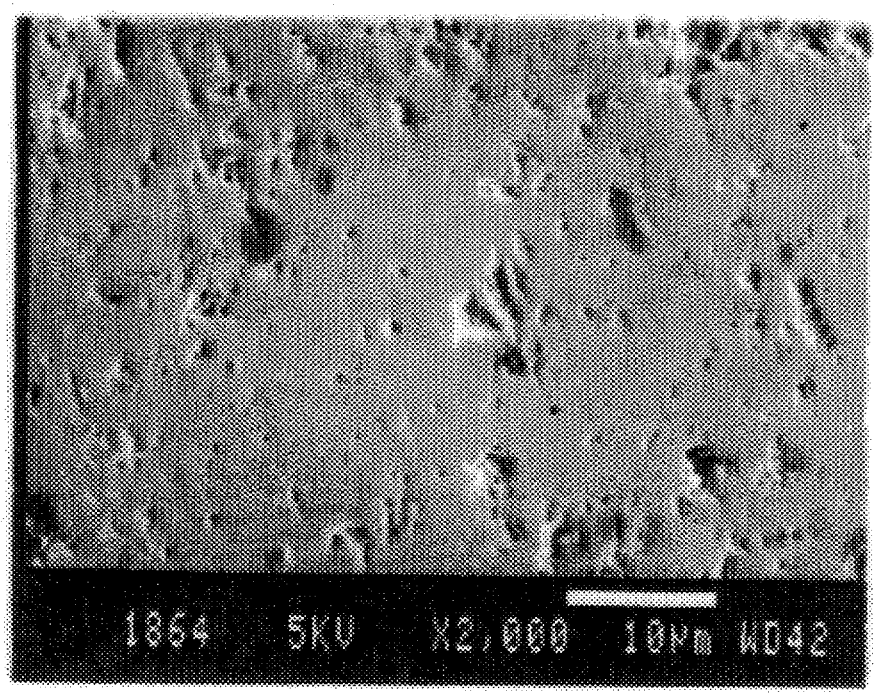
FIG. 6 is a photomicrograph at increased magnification of the alumina coating of FIG. 5.

The dense alumina coating shown in FIGS. 5 and 6 was formed on a 304 stainless steel substrate as follows:

| | |
|---|---|
| Plasma gas | 40 slm Ar/40 slm He where slm is standard liters per minute |
| Torch power | 800 Amp, 50 V, and 40 Kilowatts for model F4MB torch |
| Powder size and feed | 9 micron alumina powder from Miller Thermal Corporation 5 slm Ar carrier gas at 35 psi and at a 0.28 rpm setting of the twin 10 powder feeder (equals approximately 1.6 grams/minute powder feed rate) - FIG. 3 injector with 40 degree discharge passage angle at 40 mil minor dimension |
| Air jets | at 48 psi supply line pressure angle of approximately 30 degrees relative to torch longitudinal centerline |
| Torch robot | 20 passes at scan of 160 mm/second in a 3 mm step ladder pattern horizontal to the substrate and at a distance of 5.5 cm from substrate. The ladder pattern is repeated left to right/right to left pattern of opposite linear torch movements with a 3 mm step or spacing between the lines of opposite movement. |

The alumina coating produced was approximately 100 microns in thickness. FIGS. 5 and 6 illustrate that a high density coating was produced having no through cracks and uniform distribution of fine closed porosity that is not interconnected, either pore-to-pore or to the surface of the coating to reduce the coating permeability to gas or liquid.

EXAMPLE 2

Figure 7:
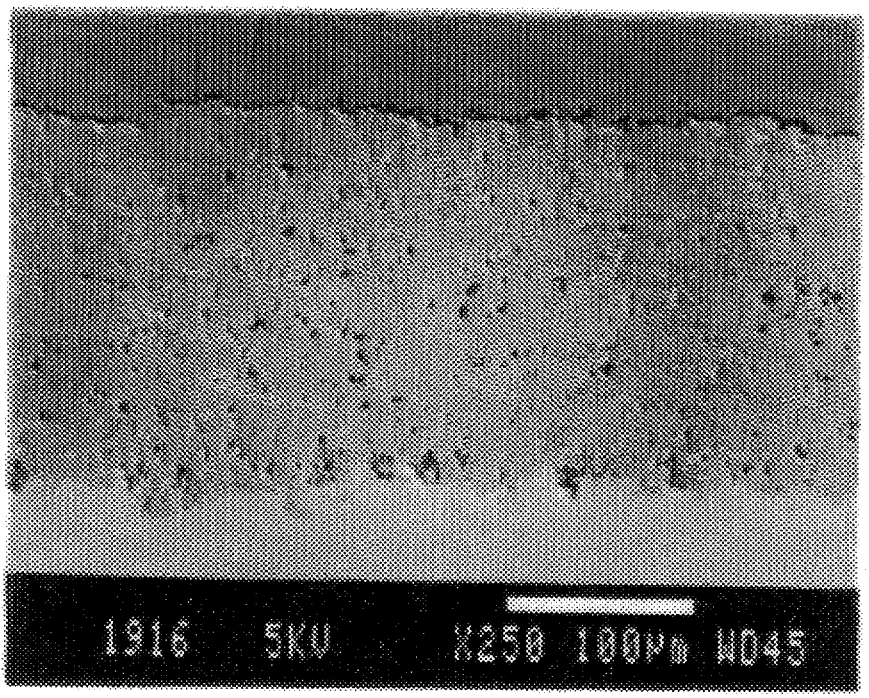
FIG. 7 is a photomicrograph of an alumina coating of the invention comprising plasma sprayed 9 micron diameter alumina powder using an Ar/H2 plasma.
Figure 8:
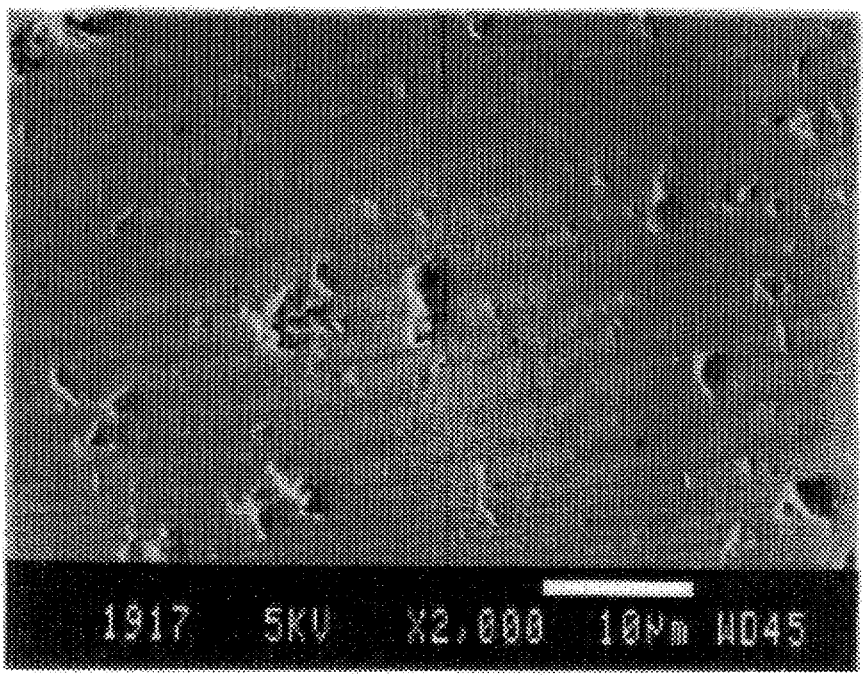
FIG. 8 is a photomicrograph at increased magnification of the alumina coating of FIG. 7.

The dense alumina coating shown in FIGS. 7 and 8 was formed on a 304 stainless steel substrate as follows:

| | |
|---|---|
| Plasma gases | 40 slm Ar/12.5 slm H2 |
| Torch power | 510 Amp, 73.4 V, and 37.5 Kilowatts for model F4MB torch |
| Powder size and feed | 9 micron alumina powder from Miller Thermal Corp. 5 slm Ar carrier gas at 35 psi and 0.28 rpm setting of twin 10 powder feeder (1.6 grams/minute powder feed rate) - FIG. 3 injector with 40 degree discharge passage angle at 40 mil minor dimension |
| Air jets | at 48 psi angle of approximately 30 degrees relative to torch longitudinal centerline |
| Torch robot | 11 passes at scan of 160 mm/second in a 3 mm step ladder pattern and at a distance of 5.5 cm from substrate |

The alumina coating produced was approximately 150 microns in thickness. FIGS. 7 and 8 illustrate that a high density coating was produced having no through cracks and uniform distribution of fine closed porosity that is not interconnected, either pore to pore or to the surface of the coating to reduce the coating permeability to gas or liquid.

EXAMPLE 3

Figure 9:
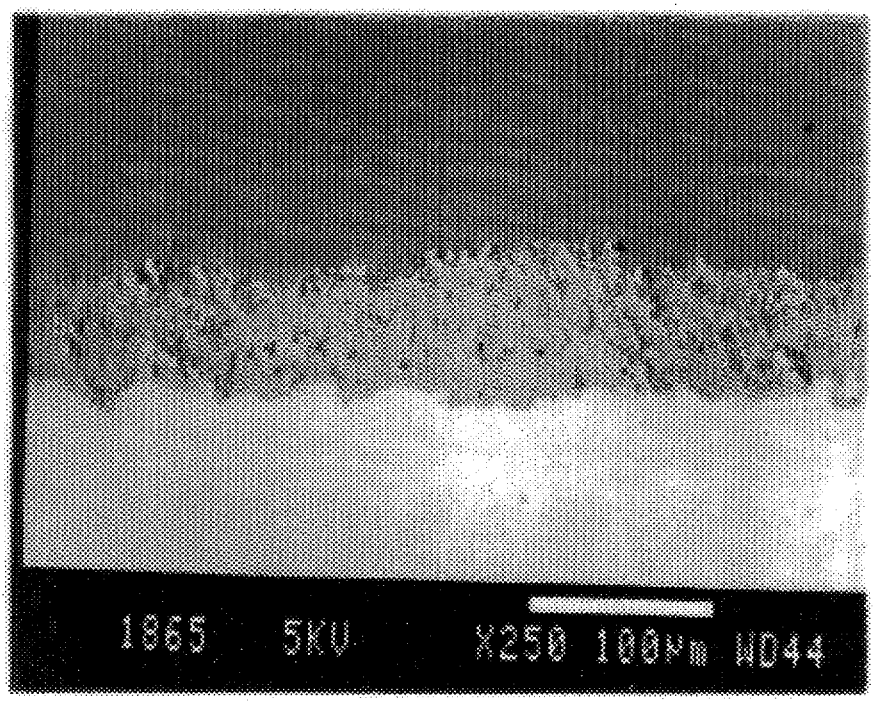
FIG. 9 is a photomicrograph of an alumina coating of the invention comprising plasma sprayed 1 micron diameter 30 alumina powder using Ar/He plasma.
Figure 10:
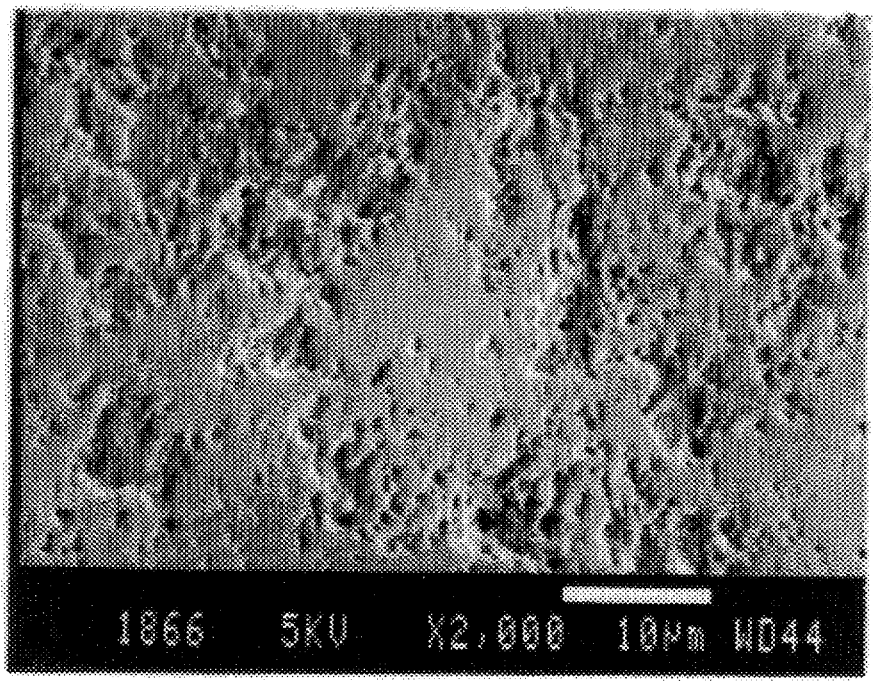
FIG. 10 is a photomicrograph at increased magnification of the alumina coating of FIG. 9.

The dense alumina coating shown in FIGS. 9 and 10 was formed on a 304 stainless steel substrate as follows:

| | |
|---|---|
| Plasma gases | 40 slm Ar/40 slm He |
| Torch power | 800 Amp, 50 V, and 40 Kilowatts for model F4MB torch |
| Powder size and feed | 1 micron alumina polishing powder from Union Carbide Corp. 8 slm Ar carrier gas at 35 psi and 0.5 rpm setting of twin 10 powder feeder - FIG. 3 injector with 40 degree discharge passage angle at 28 mil minor dimension |
| Air jets | at 48 psi angle of approximately 30 degrees relative to torch longitudinal centerline |
| Torch robot | 40 passes at scan of 160 mm/second in a 3 mm step ladder pattern and at a distance of 5.5 cm from substrate |

The alumina coating produced was approximately 100 microns in thickness. FIGS. 9 and 10 illustrate that a high density coating was produced having no through cracks and uniform distribution of fine closed porosity that is not interconnected, either pore to pore or to the surface of the coating.

EXAMPLE 4

Figure 11:
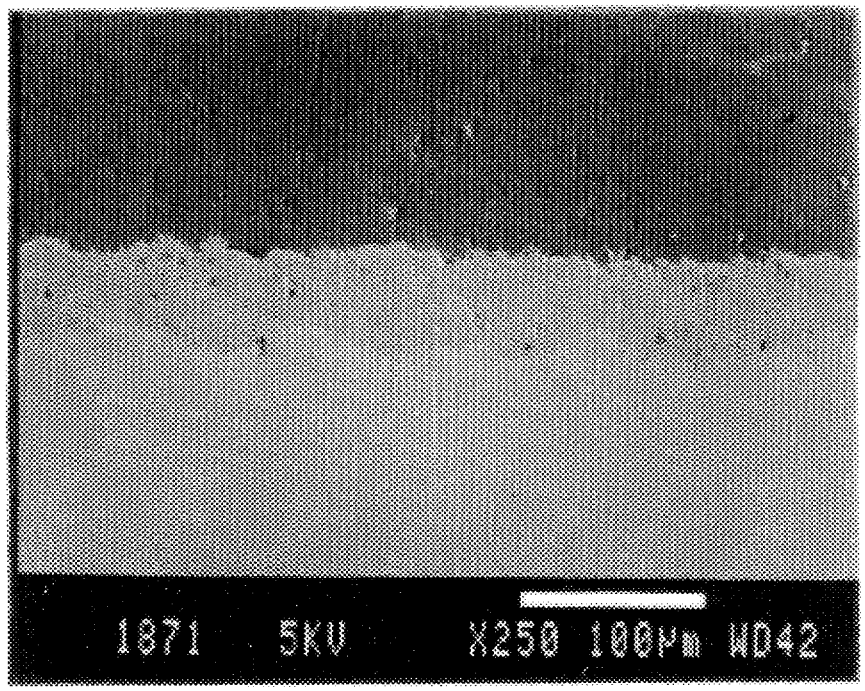
FIG. 11 is a photomicrograph of a chromia coating of the invention comprising plasma sprayed 1-3 micron diameter chromia powder using Ar/hydrogen plasma.
Figure 12:
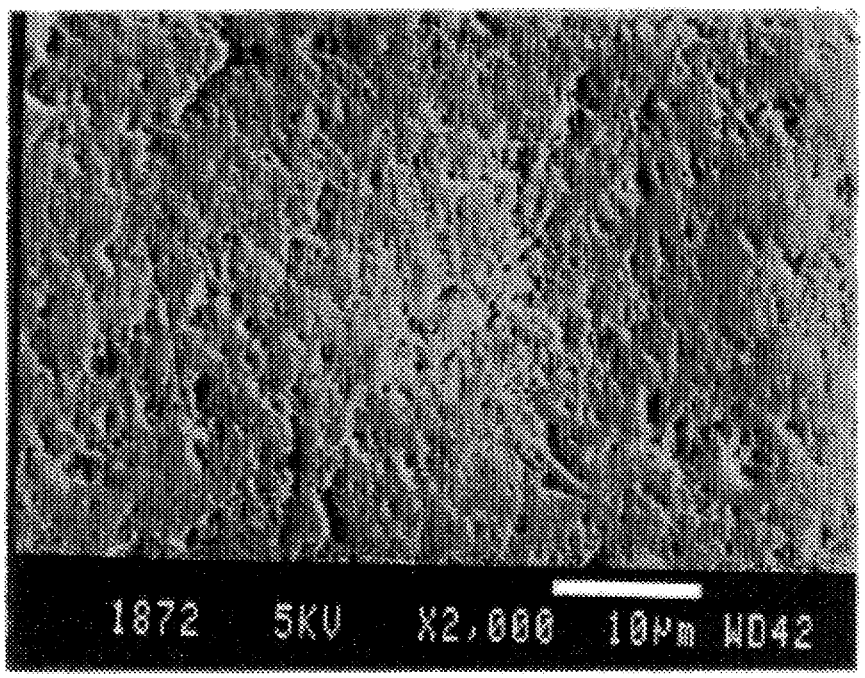
FIG. 12 is a photomicrograph at increased magnification of the chromia coating of FIG. 11.

The dense chromia coating shown in FIGS. 11 and 12 was formed on a 304 stainless steel substrate as follows:

| | |
|---|---|
| Plasma gases | 40 slm Ar/11 slm Hydrogen |
| Torch power | 650 Amp, 68 V, and 44 Kilowatts for model F4MB torch |
| Powder size and feed | 1 micron chromia powder from Applied Powder Technologies Inc. 5 slm Ar carrier gas at 35 psi and 0.3 rpm setting of twin 10 powder feeder - FIG. 3 injector with 40 degree discharge passage angle at 40 mil minor dimension |
| Air jets | at 48 psi angle of 30 degrees relative to torch longitudinal centerline |
| Torch robot | 10 passes at scan of 160 mm/second in a 3 mm step ladder pattern and at a distance of 11 cm from substrate |

The chromia coating produced was approximately 30 microns in thickness. FIG. 11 and 12 illustrate that a high density coating was produced having no through cracks and uniform distribution of fine closed porosity that is not interconnected, either pore to pore or to the surface of the coating.

EXAMPLE 5

The dense yttria stabilized zirconia (YSZ) coating shown in FIGS. 11 and 12 was formed on a 304 stainless steel substrate as follows:

| | |
|---|---|
| Plasma gases | 30 slm Ar/13.5 slm Hydrogen |
| Torch power | 510 Amp, 72.1 V, and 36.8 Kilowatts for model F4MB torch |
| Powder size and feed | 1–10 micron YSZ powder from Applied Powder Technologies, Inc. 22 cfh (cubic feet per hour) Ar carrier gas at 35 psi and 0.65 wheel rpm of Miller powder feeder - FIG. 3 injector with 40 degree discharge passage angle at 40 mil minor dimension |
| Air jets | at 48 psi angle of 30 degrees relative to torch longitudinal centerline |
| Torch robot | 70 passes at a scan of 350 mm/second in a 3 mm step ladder pattern and at a distance of 5.0 cm from substrate |

Figure 13:
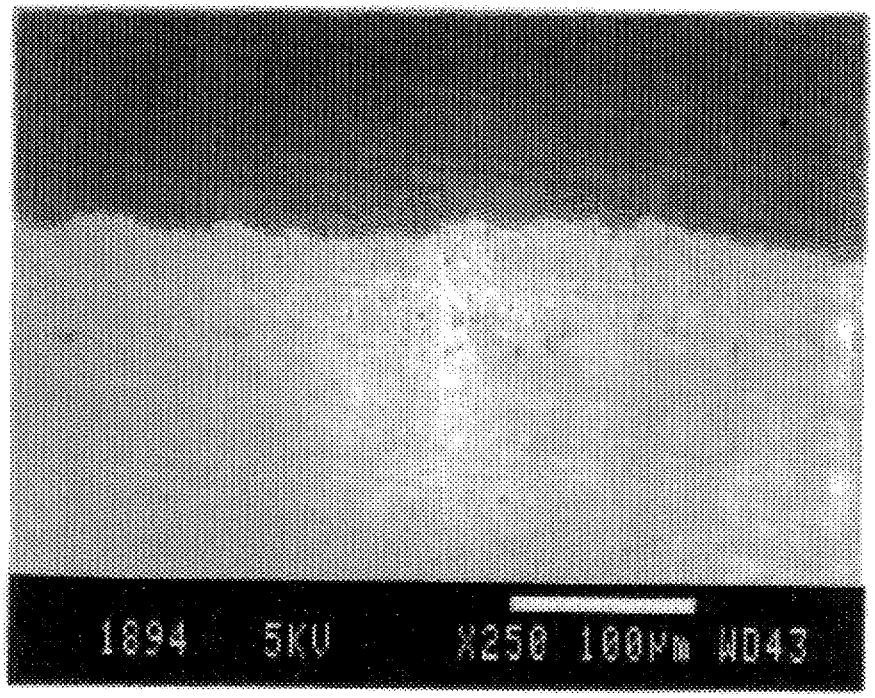
FIG. 13 is a photomicrograph of a yttria stabilized zirconia (YSZ) coating of the invention comprising plasma sprayed 1-10 micron diameter YSZ particles using Ar/hydrogen plasma.
Figure 14:
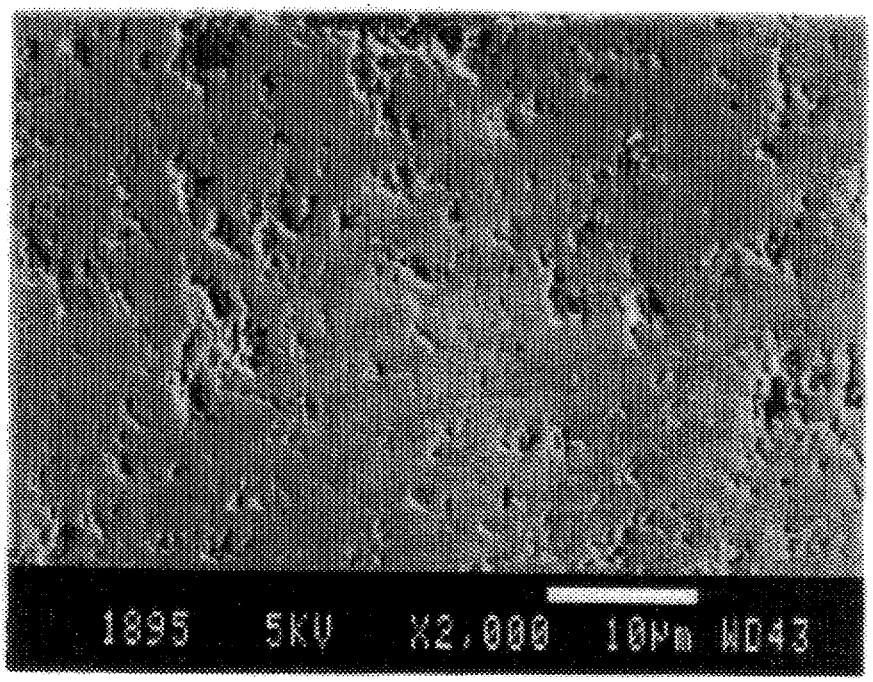
FIG. 14 is a photomicrograph at increased magnification of the YSZ coating of FIG. 13.

The YSZ coating produced was 60 microns in thickness. FIGS. 12 and 13 illustrate that a high density coating was produced having no through cracks and uniform distribution of fine closed porosity that is not interconnected, either pore to pore or to the surface of the coating.

We claim:

1. Apparatus for coating a surface, comprising:
   a) a plasma torch having a discharge end from which a plasma plume is directed toward said surface, and
   b) a powder injector having a powder supply passage and a powder discharge passage having a generally elliptical cross sectional shape with a major and minor passage dimension and with a reduced cross-sectional area as compared to that of said powder supply passage proximate a particle injection region of said plume, said powder discharge passage being oriented at an angle between about 30 and 60 degrees relative to an axis perpendicular to a longitudinal axis of said torch for introducing powder particles in the size range less than about 20 microns diameter into an outer mantle of the plasma plume.

2. The apparatus of claim 1 including first and second nozzles for discharging first and second gas jets at the plasma plume downstream of said powder injector at opposite sides of said plasma plume to enhance entrainment of the injected powder particles in said outer mantle, said torch plasma plume depositing the melted powder on said surface as a dense coating.

3. The apparatus of claim 1 wherein the powder injector comprises a converging supply passage and said powder discharge passage communicating therewith a distance from an end thereof.

4. The apparatus of claim 3 wherein said converging supply passage has a conical shape and said discharge passage intersects therewith at a distance from an apex of said conical shape.

5. The apparatus of claim 3 wherein said converging supply passage has a partial hemispherical shape and said discharge passage intersects therewith a distance from an end of said hemispherical shape.

6. The apparatus of claim 1 wherein said injector includes a particle discharge passage having a minor dimension in the range of 28 to 50 mils and a major dimension less than 3 times the minor dimension to supply powder particles in the size range of about 0.1 to less than about 20 microns diameter.

7. The apparatus of claim 1 wherein said injector is disposed downstream and external of said torch and includes an aerodynamic surface that reduces powder particle accumulation on said surface.

8. The apparatus of claim 7 wherein said aerodynamic surface comprises a hemispherical surface having a flat thereon where a particle deflector surface terminates.

9. The apparatus of claim 1 wherein a plurality of powder injectors are equally spaced about the plasma plume.

10. The apparatus of claim 2 wherein said nozzles are compressed air jet nozzles communicated to a source of compressed air.

11. The apparatus of claim 1 wherein said powder injector is disposed downstream and external of said torch and includes a threaded outer surface.

12. The apparatus of claim 1 wherein said powder discharge passage has a diverging elliptical cross section in a direction toward an exterior surface of said powder injector.

13. The apparatus of claim 1 further including a gas injection passage on said powder injector upstream of said powder discharge passage.

* * * * *